United States Patent
Fukushima

(10) Patent No.: US 8,559,125 B2
(45) Date of Patent: *Oct. 15, 2013

(54) SEAMLESS AND UNTRIMMED PRIMARY SERVO BURST WITH MULTIPLE SECONDARY SERVO BURSTS

(75) Inventor: Craig N. Fukushima, Monte Sereno, CA (US)

(73) Assignee: HGST Netherlands B.V., Amsterdam (NL)

( * ) Notice: Subject to any disclaimer, the term of this patent is extended or adjusted under 35 U.S.C. 154(b) by 2594 days.

This patent is subject to a terminal disclaimer.

(21) Appl. No.: 11/125,597

(22) Filed: May 9, 2005

(65) Prior Publication Data

US 2005/0207051 A1 Sep. 22, 2005

Related U.S. Application Data

(63) Continuation of application No. 10/104,649, filed on Mar. 21, 2002, now Pat. No. 6,917,487.

(51) Int. Cl.
*G11B 5/596* (2006.01)

(52) U.S. Cl.
USPC .......................................... 360/55; 360/77.08

(58) Field of Classification Search
None
See application file for complete search history.

(56) References Cited

U.S. PATENT DOCUMENTS

| | | | | |
|---|---|---|---|---|
| 5,867,341 A | * | 2/1999 | Volz et al. | 360/77.08 |
| 5,892,634 A | * | 4/1999 | Ito et al. | 360/77.08 |
| 6,057,977 A | * | 5/2000 | Cunningham | 360/77.08 |
| 6,519,107 B1 | * | 2/2003 | Ehrlich et al. | 360/75 |

* cited by examiner

*Primary Examiner* — Wayne Young
*Assistant Examiner* — James L Habermehl

(57) ABSTRACT

A disk storage system having servo data stored thereon for accurate head position control over a magnetic or other storage medium. The servo data is seamless and untrimmed and consists of a primary servo burst set (AB burst) in which the difference defines the desired tract pitch for the surface. Multiple secondary servo burst sets (e.g., CD burst and EF burst) are written at the desired track pitch but radially offset from the primary burst set. In one embodiment, two secondary servo burst sets are used, but alternatively, any number of secondary servo burst sets could be used. In this exemplary embodiment having two secondary servo burst sets, the CD servo burst set is offset by ⅓ of the track pitch from the primary servo burst set. Also in this embodiment, the EF servo burst set is offset by ⅔ of the track pitch from the primary servo burst set. There are six bursts per set. The servo data is written in multiple servo sectors around the surface of the medium. From the servo data, three PES (position error signals) are generated, A–B, C–D and E–F, for providing linear position sensitivity information to the head position control logic. The resulting PES is more linear for smaller head sizes.

14 Claims, 8 Drawing Sheets

SEAMLESS AND UNTRIMMED PRIMARY SERVO BURST WITH MULTIPLE SECONDARY SERVO BURSTS

CROSS-REFERENCE TO RELATED APPLICATION

This application claims priority from co-pending U.S. patent application Ser. No. 10/104,649, filed on Mar. 21, 2002, entitled "SEAMLESS AND UNTRIMMED PRIMARY SERVO BURST WITH MULTIPLE SECONDARY SERVO BURSTS," by Fukushima, and assigned to the assignee of the present application, which is herein incorporated by reference.

BACKGROUND OF THE INVENTION

1. Field of the Invention

The present invention relates to the field of data storage devices. More specifically, embodiments of the present invention relate to an improved servo burst pattern for a hard disk drive.

2. Related Art

A disk storage system, such as a magnetic hard disk drive (HDD), uses one or more disks or "platters" as a data recording medium. The HDD records data on the disk by use of a head which can also reproduce data from the disk.

Increased levels of storage capacity in floppy and hard disk drives are a direct result of the higher track densities possible with voice-coil and other types of servo positioners used today. Previously, low track density disk drives were able to achieve satisfactory head positioning with lead screw and stepper motor mechanisms. However, when track densities are so great that the mechanical error of a lead screw-stepper motor combination is significant compared to track-to-track spacing; an embedded servo-pattern became necessary so that the position of the head can be determined from the signals it reads off of the storage medium.

As a result, conventional hard disk manufacturing techniques often include writing servo-patterns (or servo "bursts") on the media of a head disk assembly (HDA) with a specialized servowriter instrument. Conventional disk drive assemblies typically include one or more disks, which include a plurality of concentric tracks that are radially displaced from each other on the surface of the disk for storing data. During disk fabrication, servo data is written on the disk by a servowriting process to delineate the centerlines of the tracks. During subsequent disk operations, the servo data is also read by a read/write head to provide information regarding the position of the head with respect to the track. The head position information enables a servo controller to re-align the head over a track when position errors are detected. Conventional servo-patterns typically comprise short bursts, very precisely located offset from a track's center line, on either side. Each track has a preset number of data sectors arranged between the servo sectors and user data is recorded in the data sector. The servo information may include cylinder data (track address code) used for the seeking operation and servo burst data.

The servo bursts are written in a sector header area, and can be used to find the center line of a track. Staying on track center is required during both reading and writing. These servo-pattern areas allow a head to follow a track center line around a disk, even when the track is out of round, as can occur with spindle wobble, disk slip and/or thermal expansion.

More specifically, the bursts are generally, but not required to be, located in a trajectory within a track. The servo burst data is constructed by a plurality of burst patterns for deriving a positional error (position data) of the head in a range of the target head or in a range to the adjacent track after the head is moved to a position near the target track by the seeking operation. The processor of the head positioning control circuit converts the amplitude of a position signal waveform (PES) obtained when the head reads the burst pattern into digital data and effects the processing operation for deriving the positional error by using the digital data. As technology advances provide smaller disk drives, and increased track densities, the placement of servo-patterns becomes crucial for successful hard drive designs.

Servo-patterns are conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a displacement measuring device for positional feedback is used to precisely determine transducer location and is the basis for burst placement and spacing of bursts in successive tracks.

FIG. 1A illustrates a conventional "quad" burst servo pattern, see below with reference to U.S. Pat. No. 5,381,281, which includes: (1) an AB servo burst set 20 and 30; and (2) a CD servo burst set 40 and 50. The quad burst servo pattern is written radially within a servo sector and is shown horizontally in FIG. 1A for illustration. The differences between adjacent edges of the A servo burst 20 and the B servo burst 30 define the track center lines and the difference between track center lines defines the track pitch (TP) as shown by 95. Five tracks are shown, i.e., n to n+4. As the read head moves over this servo pattern, position error signals are generated. In the ideal case, position error signals 60 and 70 are generated by this quad burst servo pattern. Position error signals (or "sensitivity signals") are used to determine the position of the head. For instance, position error signal 60 represents the signals from pattern A minus the signals from pattern B (A−B) and is maximum when the head is in the middle of a burst A and is minimum when the head is in the middle of a burst B. Position error signal 70 represents the signals from pattern C minus the signals from pattern D (C−D) and is maximum when the head is in the middle of a burst C and is minimum when the head is in the middle of a burst D.

In the typical case, gaps between servo bursts and small read heads tend to "round" the tops and bottoms of the ideal position error signals 60 and 70. Therefore, to remain within the linear portions of these signals, the head position control circuit follows a signal 80 that, in effect, switches back and forth between the two signals 60 and 70. The switching occurs when the two signals 60 and 70 have the same magnitude, e.g., at points 90a-90g, thereby avoiding the nonlinear regions located within the tops and bottoms of signals 60 and 70 in the non-ideal case. The first switch of a track occurs at TP/4 and the next occurs at TP/2.

FIG. 1B illustrates a case where the servo bursts are written using a seamless and untrimmed technique, e.g., the positions of burst A and C elements are independent of the positions of burst B and D elements. Because of the independent positioning, seamless writing techniques offer less error than seamed techniques. However, depending on the allowed tolerances, gaps between servo bursts and very small read heads can be expected. As a result of these gaps and due to small read heads, flat or dead zones can appear in the actual position errors signals 60' and 70'. In some cases, the flat or dead zones appear in both signals 60' and 70' at the same head position, e.g., 100a, 100b and 100c. At these positions, the head positioning control circuit is not able to use either of the position error signals to determine the head location because neither signal changes with head position. This can lead to a fatal result for a modern disk drive.

According to U.S. Pat. No. 6,049,442, a servo pattern for use on a data storage surface includes at least one track to minimize position error during positioning of a transducer over the data storage surface. The servo pattern includes a plurality of servo burst fields of constant amplitude for defining a centerline of the track and for determining the position of the transducer. According to this technique, at least one servo burst field comprises N segments, where N is equal to or greater than 2, and each of the N segments is written with constant amplitude. The amplitude of the at least one servo burst field is then determined as a function of the amplitudes of the N segments.

According to U.S. Pat. No. 5,381,281, a quadrature based embedded servo control system is described to realize a high track density, high-performance hard disk drive system. Each data sector includes a gray code field spanning the entire width of the data track and a quad-servo burst pattern having first, second, third, and fourth servo burst fields distributed along the length of a portion of the data sector. The center point of the first, second, third, and fourth servo bursts are sequentially offset from the adjacent burst by a radial distance equivalent to one-half of the data track width. The quad-servo burst pattern is used with a track-following algorithm based on the quadrature value of (A+B)−(C+D) to obtain a substantially increased servo lock range. A second gray code field extending substantially the width of the data track and second quad-servo burst pattern substantially identical to the first is provided near a mid-point in the data portion of the data sector to increase the servoing information sample rate and accuracy, thereby permitting increased data track densities to be utilized.

According to U.S. Pat. No. 5,946,157, a rotating magnetic storage disk drive is described having a method of seamlessly recording circumferentially overlapping servo bursts on a magnetic disk with successive passes of a write head that is guided by a servo track writer wherein the servo bursts are contained in at least two servo burst groups that each have at least one circumferential burst position which may contain a servo burst. The method includes turning a write current on while passing the write head over a current ramp region that does not contain servo data and is located in front of an "active" servo burst group that will be modified on this pass, modifying a servo burst in at least one circumferential position of the active servo burst group with the write current on. The method includes turning the write current off while passing the write head over a current ramp region that does not contain servo data and is located in front of a "passive" servo burst group that will not be modified on this pass and then skipping over at least one circumferential burst position of the passive servo burst group with the write current off.

However, what is needed is a servo mechanism that eliminates the problems associated with non-linearities in the position error signals but also allows seamless and untrimmed servo burst writing techniques which are better than above described art.

SUMMARY OF THE INVENTION

Accordingly, embodiments of the present invention provide a servo mechanism that eliminates the problems associated with non-linearities in the position error signals but also allow seamless and untrimmed servo burst writing techniques. Seamless servo writing techniques are advantageous as a result of position error cancellation in the servo bursts. Embodiments of the present invention provide a seamless servo burst pattern that provides a linear position error signal used to improve position sensitivity. The present invention provides these advantages and others not specifically mentioned above but described in the sections to follow.

A disk storage system is described herein having servo data stored thereon for accurate head position control over a magnetic or other storage medium. The servo data is written using seamless and untrimmed writing techniques and consists of a primary servo burst set (AB burst set) in which the difference between them defines the desired tract pitch for the surface. Multiple secondary servo burst sets (e.g., CD burst set and EF burst set) are written at the desired track pitch but radially offset from the primary burst set. In one embodiment, two secondary servo burst sets are used, but alternatively, any number of secondary servo burst sets (two or greater) could be used.

In the exemplary embodiment having two secondary servo burst sets, the CD servo burst set is offset along its radial lines by ⅓ of the track pitch from the primary servo burst set. Also in this embodiment, the EF servo burst set is offset along its radial lines by ⅔ of the track pitch from the primary servo burst set. There are six bursts per set. The servo data is written in multiple servo sectors around the surface of the medium. From the servo data, three PES (position error signals) signals are generated, A–B, C–D and E–F, for providing linear position sensitivity information to the head position control logic. The resulting PES is more linear for smaller head sizes. The head position control logic follows the most linear path of these multiple PES signals. In the embodiment using two secondary servo burst sets, the PES signal switches at TP/6 (from the zero position) and at each time the two PES signals are equal in magnitude.

Embodiments of the present invention also include the use of more than two multiple secondary servo burst sets. For instance, if three secondary servo burst sets were employed, then the first, second and third secondary servo burst sets would be offset from the primary by ¼, ½ and ¾ of a track pitch, respectively. The resulting PES signals would be A–B, C–D, E–F and G–H and PES signal switching would take place at TP/8 (from the zero position), in this embodiment, and at each time the two PES signals are equal in magnitude.

Aspects of the present invention provide better linearity for the PES signal while still maintaining the advantageous error cancellation characteristics of using seamless, untrimmed servo burst writing techniques. The embodiments of the present invention are particularly useful in providing a linear PES signal even in applications that use small heads and have gaps between servo burst elements. In these environments, the present invention provides improved position sensitivity for the head position control logic.

More specifically, an embodiment of the present invention includes a storage medium having a disk surface that has concentric tracks and a plurality of servo sectors. Each sector has recorded therein servo information that is seamless and untrimmed. This servo information is used for track positioning of a head. The servo information contains a primary burst set having a first servo data burst extending along a first radial line and a second servo data burst extending along an adjacent second radial line and having bursts that are positioned in between bursts of the first servo data burst, the difference between the primary burst set for defining positions of the concentric tracks. The servo information also contains at least two secondary burst sets adjacent but radially offset from the primary burst set and each radially offset from each other.

Embodiments also include the storage medium wherein the at least two secondary burst sets comprise: a first secondary burst set radially offset from the primary burst set and shifted along its radial line by ⅓ track pitch from the primary burst set; and a second secondary burst set radially offset from the primary burst set and the first secondary burst set and shifted along its radial line by ⅔ track pitch from the primary burst set.

Embodiments also include the storage medium wherein the first secondary burst set comprises a third servo data burst and an adjacent but radially offset fourth servo data burst, the fourth servo data burst having bursts that are written in between bursts of the third servo data burst, the third and fourth servo data bursts for providing position error signals. Embodiments also include the storage medium wherein the second secondary burst set comprises a fifth servo data burst and an adjacent but radially offset sixth servo data burst, the sixth servo data burst having bursts that are written in between bursts of the fifth servo data burst, the fifth and sixth servo data bursts for providing position error signals.

Embodiments include the storage medium wherein the primary burst set is seamless in that bursts of the first servo data burst are written in positions that are independent of the positions of bursts of the second servo data burst.

Embodiments include the storage medium wherein the at least two secondary burst sets comprise: a first secondary burst set radially offset from the primary burst set and shifted along its radial line by ¼ track pitch from the primary burst set; a second secondary burst set radially offset from the primary burst set and the first secondary burst set and shifted along its radial line by 2/4 track pitch from the primary burst set; and a third secondary burst set radially offset from the primary burst set and the first and second secondary burst sets and shifted along its radial line by ¾ track pitch from the primary burst set.

Embodiments also include a disk drive implemented in accordance with the above.

DETAILED DESCRIPTION OF THE INVENTION

In the following detailed description of the present invention, a primary servo burst set with multiple radially offset secondary servo burst sets for providing improved linear PES signals, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
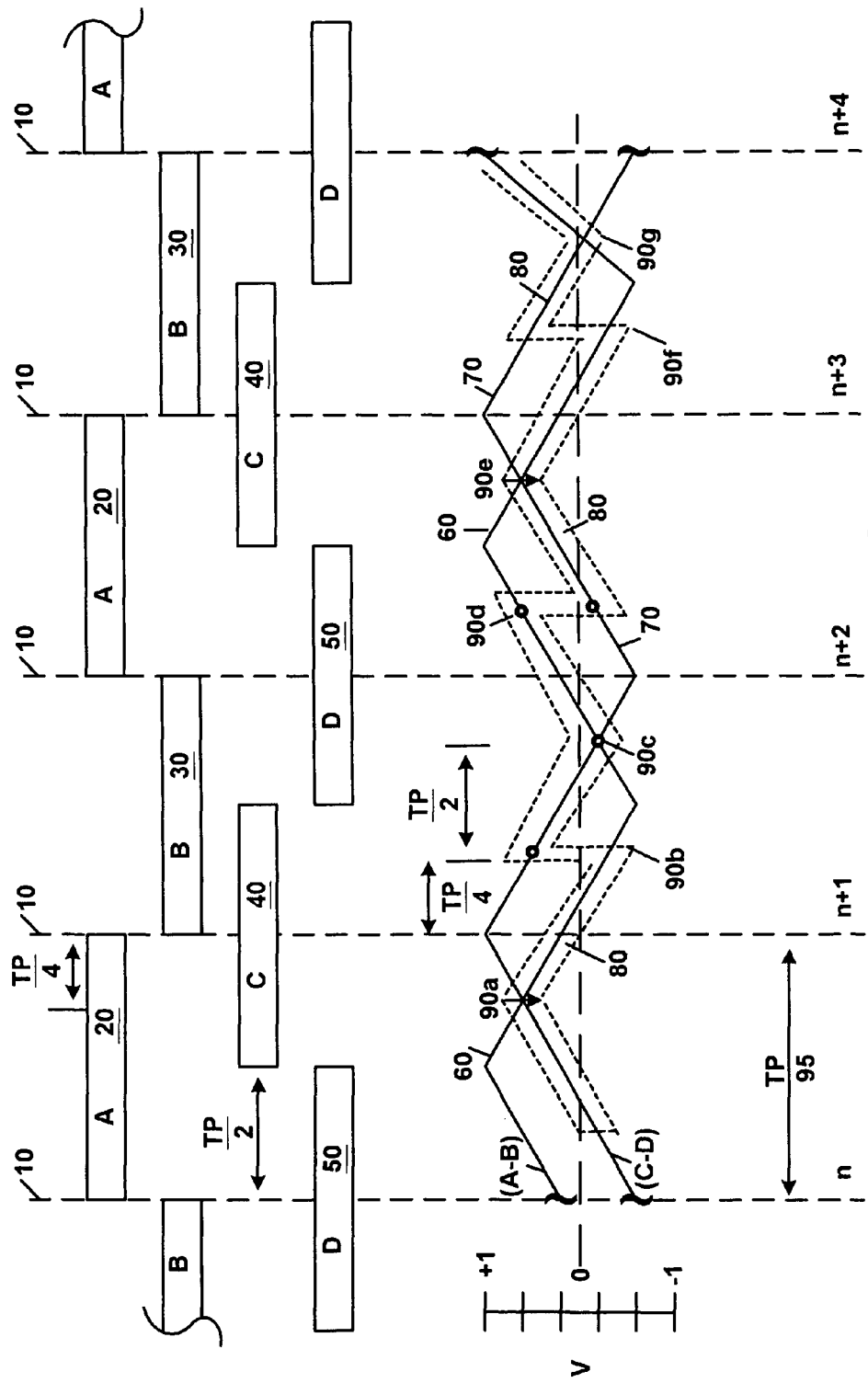
FIG. 1A illustrates prior art seamless "quad" servo burst patterns and accompanying graphs of ideal PES (position error signal) signals that may be generated therefrom.
Figure 1B:
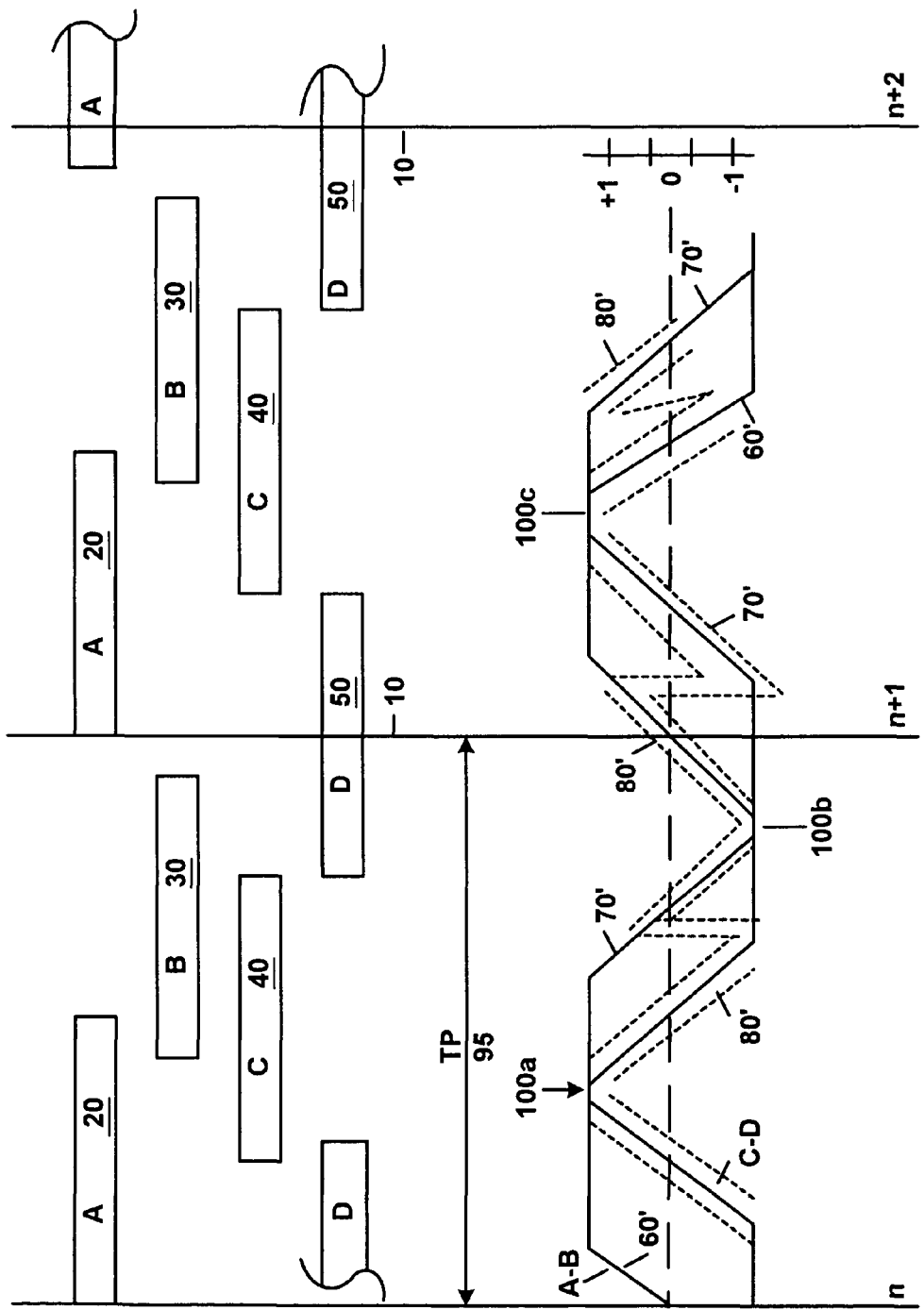
FIG. 1B illustrates prior art seamless "quad" servo burst patterns and accompanying graphs of PES signals that are generated therefrom and have unwanted dead/flat spots therein.
Figure 2:
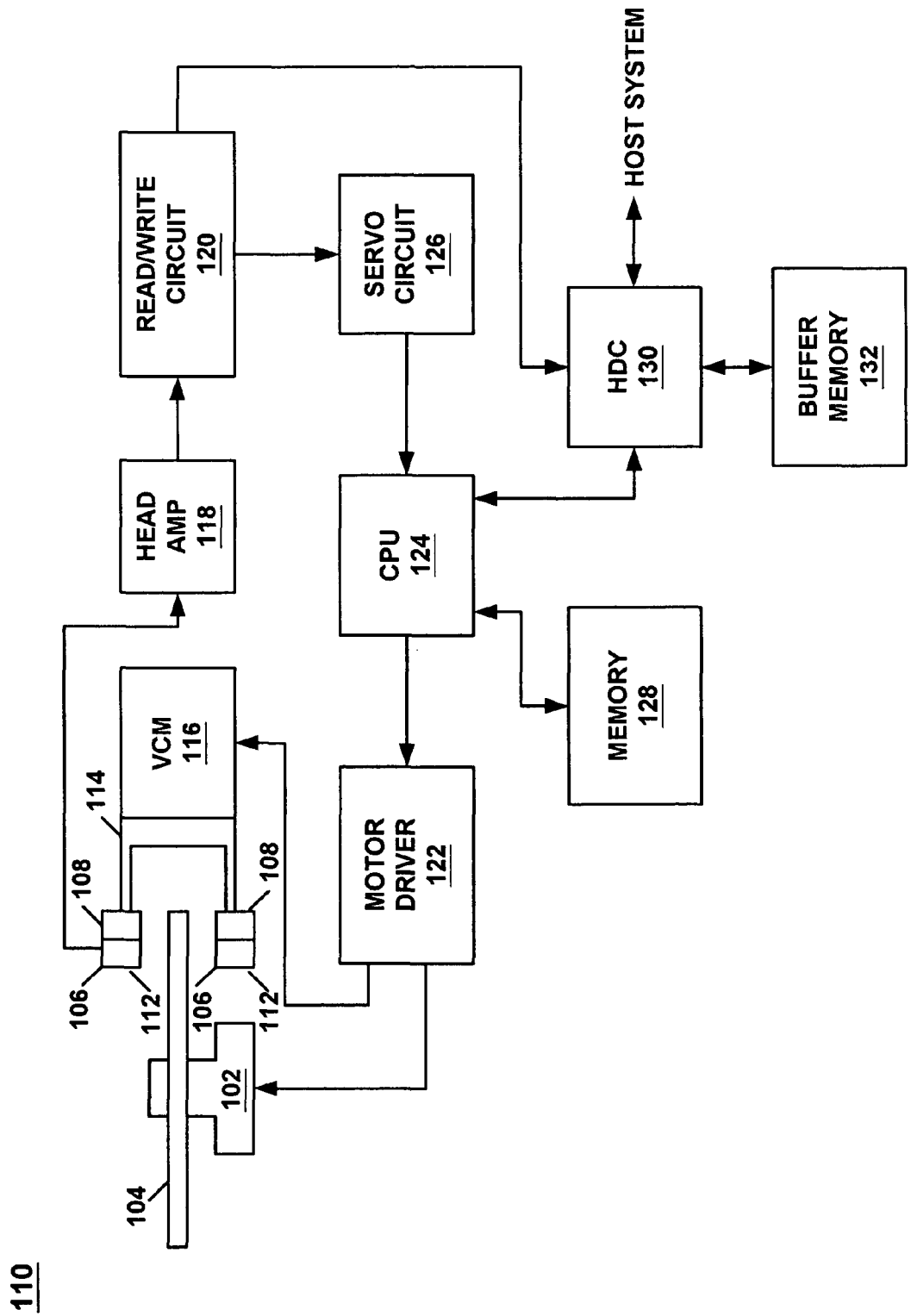
FIG. 2 is a logical block diagram of relevant components of a hard disk drive in accordance with embodiments of the present invention.

FIG. 2 illustrates an exemplary hard disk drive HDD design 110 that may be used in accordance with one embodiment of the present invention. It is appreciated that aspects of the present invention may be practiced on many different disk drive designs and that design 110 is only exemplary. HDD 110 includes reproduction/recording heads 106 each of which includes a read head 112 and a write head 108 and they may be mounted on a slider. The heads 106 are disposed to face the opposite surfaces of a storage medium, e.g., disk 104 and are held by an actuator 114. The actuator 114 is a portion of a head driving mechanism which is driven to rotate by a voice coil motor (VCM) 116 so as to move the head 106 in the radial direction to position the head. The VCM 116 is supplied with a driving current from a motor driver 122 which is controlled by a processor 124.

Figure 3:
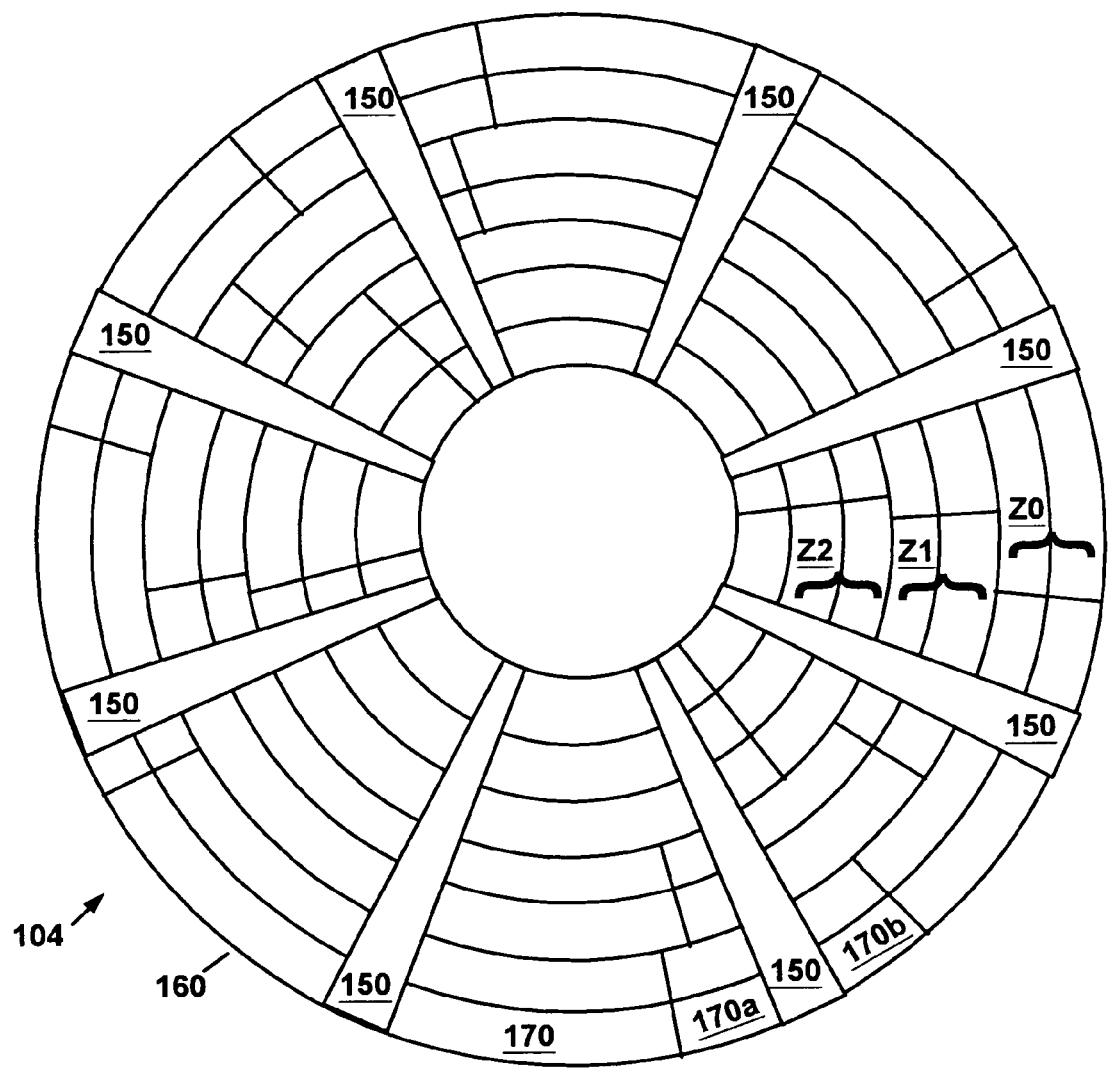
FIG. 3 is a diagram of a surface of a storage medium used in accordance with an embodiment of the present invention illustrating data sectors and servo sectors.

The motor driver 122 may drive both of the VCM 116 and a spindle motor 102. The spindle motor 102 is a disk rotating motor for rotating the disk 104 at high speed. One disk or a plurality of disks (in this example, one disk is used for convenience) are mounted on the spindle motor 102 and the disk 104 has a large number of concentric tracks formed thereon as will be described later (FIG. 3).

Generally, a read/write circuit 120 of FIG. 2 is used for effecting the signal processing operations necessary for the data read/write operation. A read signal read out by the read head 112 is amplified by a head amplifier 118 and then supplied to the read/write circuit 120. The read/write circuit 120 subjects the read signal to various signal processing operations such as an AGC (automatic gain control) amplifying process, a filtering process, a digital conversion process, and a decoding process. The read/write circuit 120 converts the read signal into reproduction data of NRZ code (write data) and transfers the reproduction data to a disk controller (HDC) 130. At the time of data writing operation, the read/write circuit 120 effects the encoding process for modulating the NRZ data which is write data transferred from the HDC 130 into RLL (run-length coding) data, for example, and outputs the modulated data to the write head 108 via the head amplifier circuit 118.

Further, the read/write circuit 120 of FIG. 2 effects the process for reproducing servo information necessary for the head positioning control in addition to the normal signal process for user data. As described before, the servo information is constructed by cylinder data (track address code) used for the seeking operation and servo burst data relating to this invention. The cylinder data is recorded by use of Gray code. The read/write circuit 120 subjects a read signal (servo read signal) corresponding to cylinder data read out by the read head 112 to the binary-coding process and outputs the binary-coded signal to a servo circuit 126. The servo circuit 126 decodes the binary-coded signal into data of cylinder address (track address) and outputs the decoded data to the processor 124. The processor 124 recognizes the track in which the head 112 is now set according to the cylinder data at the time of seeking operation.

The read/write circuit 120 outputs a read signal corresponding to servo burst data read out by the read head 112 to the servo circuit 126 while it is maintained in the analog signal state. As will be described later, the servo burst data may be an analog signal waveform indicating an amplitude value corresponding to the position of each burst pattern. The servo circuit 126 samples values corresponding to respective burst patterns and outputs position signals corresponding to the respective values to the A/D converter of the processor 124.

The processor 124 is the main control device of the HDD 110 for head positioning control may be a micro-controller with the A/D converter and a D/A converter used for outputting a control signal. The processor 124 accesses a memory 128 to effect the head positioning control. In the memory 128, a control program (firmware) is stored for determining the operation of the processor 124.

The processor 124 effects the seeking operation for moving a head 106 to a target track based on cylinder data decoded by the servo circuit 126. Further, the processor 124 receives the servo burst data as position data affects the operation for detecting the positional error. Based on the results of the above operations, the processor 124 outputs a control signal for positioning the read head 112 to the desired target track and position. That is, the processor 124 drives the VCM 116 via the motor driver 122 according to the control signal and controls the operation of the actuator 114 to position the head 106 to the target position.

The HDC 130 is a controller which is connected to the processor 124 and constructs an interface with a host system to control the transfer of read/write data (user data). The HDC 130 exchanges a read/write command and read/write data with respect to the host system and controls a buffer memory (buffer RAM) 132 to buffer read/write data.

As shown in FIG. 3, a number of concentric tracks 160 are formed on both surfaces of the disk 104. In one embodiment, the tracks 160 are divided into a plurality of zones Z0 to Z2. In each of the tracks 160, a plurality of servo sectors 150 are arranged at regular intervals along respective radial lines. In the servo sector 150, an AGC (Automatic Gain Control) area and a sector data area are provided in addition to the cylinder data area and a servo burst data area. The AGC area is an area in which data of constant frequency for stabilizing the amplitude of a signal is recorded. The sector data area is an area in which data indicating a servo sector number is recorded. Further, in each of the tracks 160, a preset number of data sectors 170 are arranged between the servo sectors 150. The data sector 170 is an area for recording user data. In one embodiment, the number of data sectors may be different for each zone.

Figure 4:
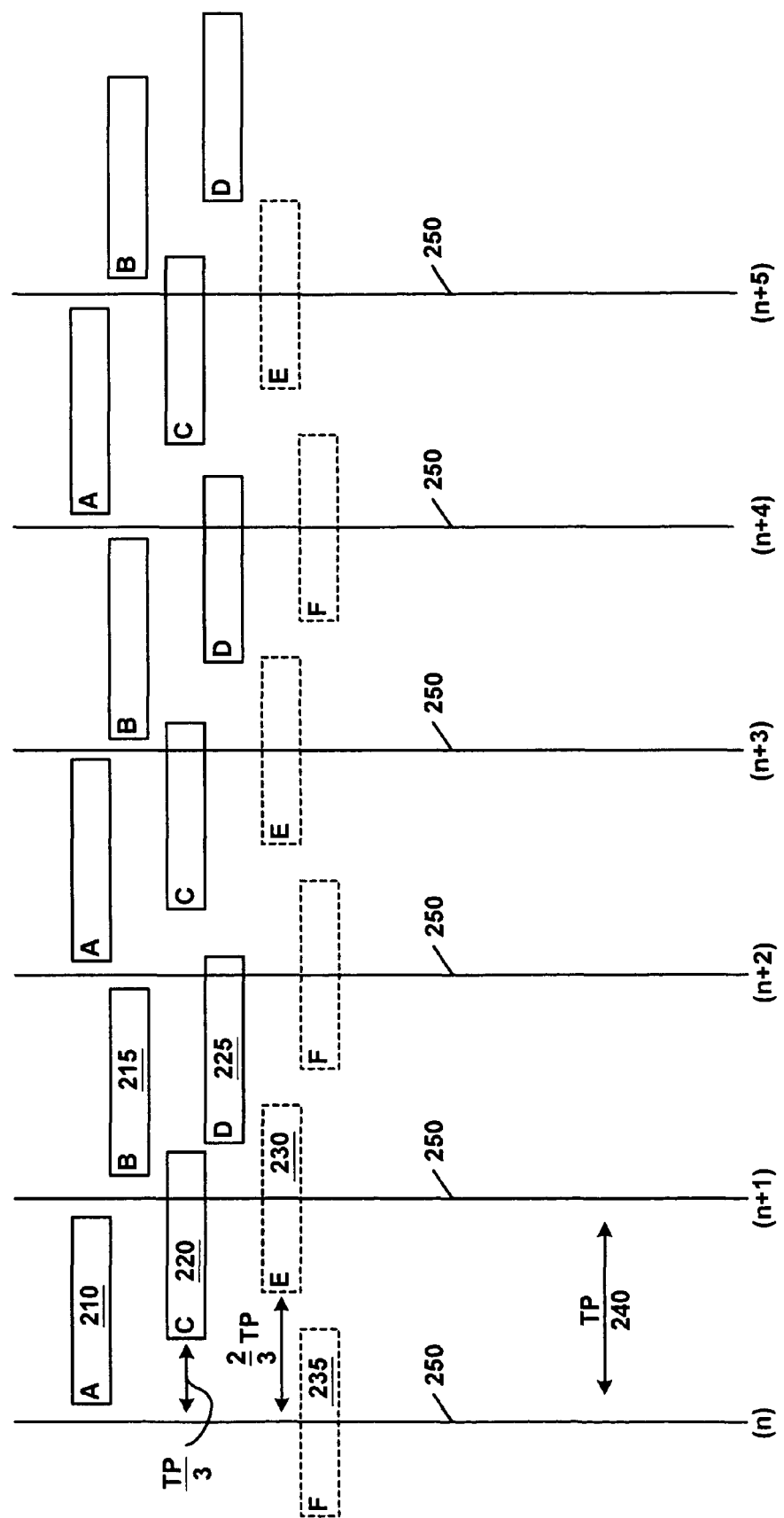
FIG. 4 illustrates a servo burst pattern in accordance with an embodiment of the present invention having a primary servo burst set (AB) and two secondary servo burst sets (CD and EF) radially offset therefrom.

FIG. 4 illustrates servo information in accordance with one embodiment of the present invention. This servo information 425 is written within each servo sector 150 (FIG. 3) and is shown in a horizontal orientation for discussion. Each burst (A through F) extends along a radial line from the center of the disk toward an outer edge. In this embodiment, there are six bursts (A through F) per track that are used for head positioning. Each burst set or pair, (A/B), (C/D) and (E/F), generates its own position error signal which are used for head positioning. Based on timing signal information placed on the disk, the head is made aware of when it is positioned over the radial line associated with one of the bursts.

More specifically, the servo information 425 of FIG. 4 consists of a primary servo burst set which includes a first servo data burst 210 ("A") and an adjacent and radially offset second servo data burst 215 ("B"). The difference between adjacent edges of the "A" and "B" bursts define the individual track locations 250. Differences in the track locations (e.g., track center lines) define the track pitch 240 for the disk. As shown, there are some exemplary track centers (n) to (n+5) for discussion. The individual bursts of the first and second servo data bursts 210 and 215 are positioned in between one another. That is, the second servo data burst 215 ("B") is shifted along its radial line by a full track pitch (TP) with respect to the first servo data burst 210 ("A") and small gaps may exist between the individual bursts of these burst sets.

In accordance with the present invention, the servo information 425 of FIG. 4 also contains multiple secondary servo burst sets which are adjacent to the primary servo burst set, but offset radially and shifted along their radial lines. For instance, a first secondary servo burst set includes a third servo data burst 220 ("C") and an adjacent and radially offset fourth servo data burst 225 ("D"). The individual bursts of the third and fourth servo data bursts 220 and 225 are positioned in between one another. Importantly, the first secondary servo burst set (C/D) is offset from the primary servo burst set (A/B) by ⅓ of a track pitch (TP/3) along their radial lines. Also, a second secondary servo burst set includes a fifth servo data burst 230 ("E") and an adjacent and radially offset sixth servo data burst 235 ("F"). The individual bursts of the fifth and sixth servo data bursts 230 and 235 are positioned in between one another. Importantly, the second secondary servo burst set (E/F) is offset from the primary servo burst set (A/B) by ⅔ of a track pitch (⅔ TP) along their radial lines.

Figure 7:
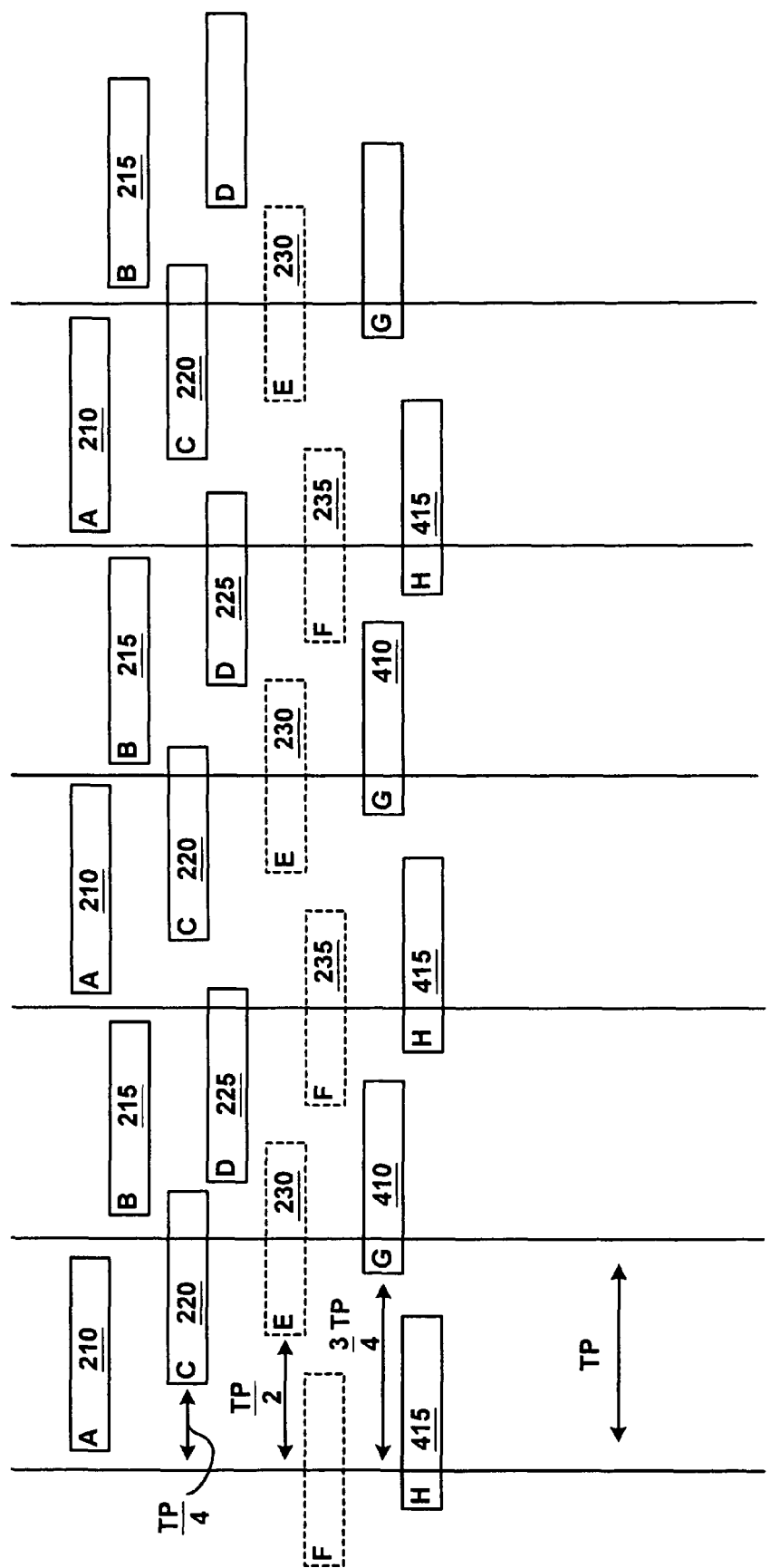
FIG. 7 illustrates a servo burst pattern in accordance with another embodiment of the present invention having a primary servo burst set (AB) and three secondary servo burst sets (CD, EF and GH) radially offset therefrom.

In the example of FIG. 4, two secondary data burst sets are shown, but it is appreciated that the present invention may operate with any number of additional secondary data burst sets. For instance, FIG. 7 illustrates an example having three secondary data burst sets, e.g., (C/D), (E/F) and (G/H), and a primary data burst set. As described in more detail below, the multiple secondary data burst sets of the present invention provide increased position error signal information that is used by the servo positioning control circuit 126 (FIG. 2) and the processor 128 (FIG. 2). By increasing the position error signal information, a more linear PES signal can be established and therefore the head 106 (FIG. 2) can be accurately positioned even if gaps between the individual servo bursts exist and small read heads are used.

It is appreciated that the ordering of the bursts, e.g., A through F is only exemplary and is presented only for discussion. It is appreciated that the burst order is arbitrary and the ordering of the bursts may be rearranged according to any order.

Figure 5:
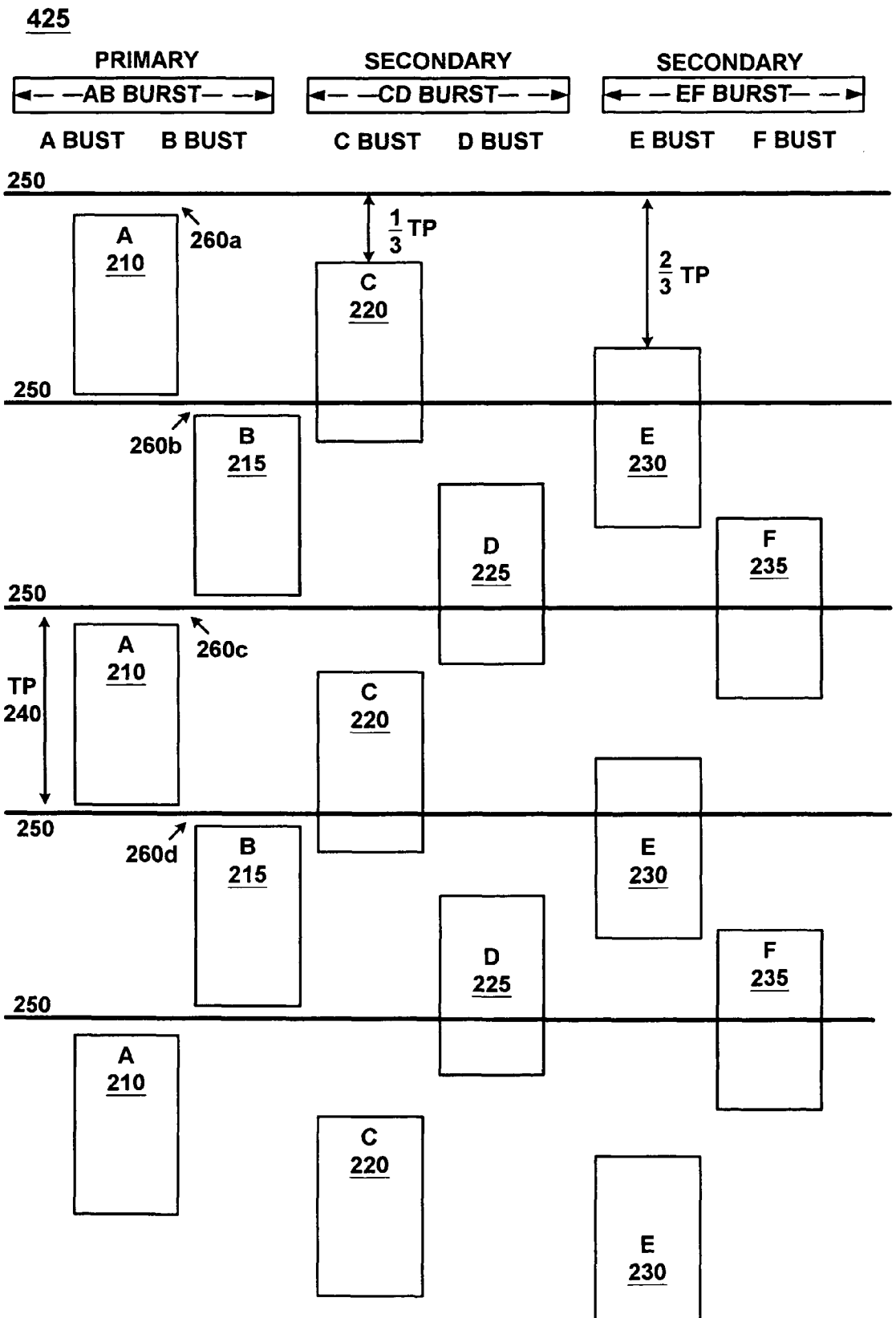
FIG. 5 illustrates a seamless writing technique used for recording the servo burst pattern of FIG. 4 in accordance with an embodiment of the present invention.

FIG. 5 illustrates the embodiment 425 in the vertical orientation having a primary servo burst set (A/B) and two secondary servo burst sets (C/D) and (E/F). In one embodiment of the present invention, the bursts of the servo information 425 are written using a seamless writing technique and are generally untrimmed meaning the edges of the bursts are fringed thereby creating small gaps between bursts of the set (e.g., between A and B). The track centers 250 are also shown which are defined by the difference between the adjacent edges of the "A" and "B" bursts.

Using a seamless servo writing technique, the bursts ("A") of servo data burst 210 are written independently of the bursts ("B") of servo data burst 215. In other words, in write cycle i, burst A is written and then in cycle i+1, burst B is written.

Therefore, errors in the positions of the A bursts are totally independent of the errors in the positions of the B bursts. In other words, the random error in the position of the A burst are independent from the random errors in the position of the B burst. In this way, using a seamless technique, the PES signal derived by (A−B) tends to statistically cancel out the uncorrelated errors, 260a and 260b, associated with the positions of the A bursts and the B bursts. That is, 260b represents the amount of error, from the ideal position, associated with the position of individual burst B and 260a represents the amount of error, from the ideal position, associated with the position of individual burst A.

Further, by taking the PES signal derived by (A−B), random errors in the track pitch are insensitive to the error component of the B burst which is correlated to the errors on the two edges of the B burst. This is because burst B is written in a separate write cycle from burst A according to seamless servo writing techniques whereby each burst is written separately and independently from the others. This is in contradiction to seamed servo writing techniques where the tail end of one individual burst is erased during the write cycle of another, adjacent, individual burst thereby tying the positions of the two individual bursts together.

Figure 6:
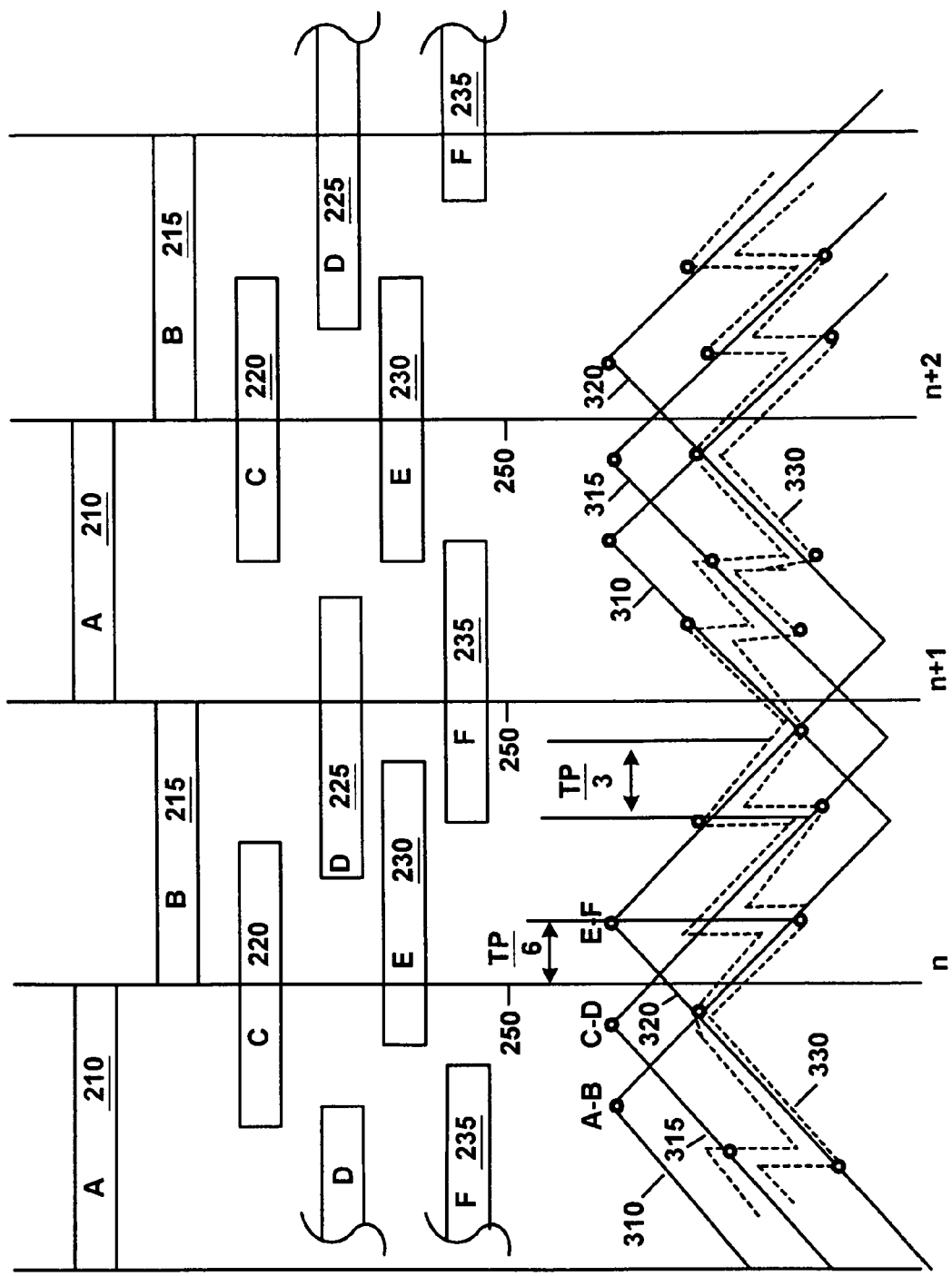
FIG. 6 illustrates the servo burst pattern in accordance with an embodiment of the present invention as shown in FIG. 4 and also illustrates the accompanying PES signals that switch at TP/6 (from the zero position) and each time the PES signals are equal in magnitude.

FIG. 6 illustrates the servo information 425 (oriented horizontally) in accordance with an embodiment of the present invention along with a graph of the three position error signals 310-320 used during head positioning. As discussed above, the primary servo burst set (A/B) generates an A−B position error signal 310 that is maximum when the read head is in the middle of burst A and is minimum when the read head is in the middle of burst B. The first secondary servo burst set (C/D) generates a C−D position error signal 315 that is maximum when the read head is in the middle of burst C and is minimum when the read head is in the middle of burst D. Lastly, the second secondary servo burst set (E/F) generates an E−F position error signal 320 that is maximum when the read head is in the middle of burst E and is minimum when the read head is in the middle of burst F. Although shown in the ideal case, it is appreciated that the top and bottom tips of the position error signals 310-320 are actually somewhat rounded and non-linear due to gaps between individual bursts and the small size of many read heads.

Although receiving all three PES signals 310-320, the servo positioning logic of the disk drive utilizes the position error signal 330 that is shown in the dotted line, for positioning the head 106 (FIG. 2). Essentially, PES 330 follows the linear portions of curves 310-320 and never ventures into the top or bottom tips which contain the non-linear regions. Specifically, PES 330 switches from one curve to another when the magnitudes of two of the curves are equal. As shown, with respect to track n, the PES 330 starts on curve 310 and switches to curve 315 after TP/6 (from the track start or zero position) and then switches to curve 320 after TP/3 and then switches to curve 310 after TP/3, etc. In any given track, the PES 330 switches at TP/6 (from the track start or zero position) and then switches after each TP/3. By switching in these amounts, the present invention guarantees that the non-linear regions of the position error signals can be avoided while still using a seamless, untrimmed servo writing technique and while still using small read heads.

FIG. 7 illustrates another embodiment of the present invention including servo information 450 that utilizes three secondary servo burst sets (C/D), (E/F) and (G/H) adjacent to the primary servo burst set (A/B). Each burst extends along a radial line from the center of the disk toward an outer edge. In this embodiment, there are eight bursts per track that are used for head positioning. The primary servo burst set (A/B) includes the "A" burst pattern 210 and the "B" burst pattern 215. The first of the secondary burst sets includes the "C" burst pattern 220 and the "D" burst pattern 225. The "C" burst pattern 220 is offset by TP/4 along its radial line from the primary servo burst set (A/B). The second of the secondary burst sets includes the "E" burst pattern 230 and the "F" burst pattern 235. The "E" burst pattern 230 is offset by TP/2 along its radial line from the primary servo burst set (A/B). Lastly, the third of the secondary burst sets includes the "G" burst pattern 410 and the "H" burst pattern 415. The "G" burst pattern 410 is offset by ¾ TP along its radial line from the primary servo burst set (A/B).

With respect to embodiment 450, four position error signals are generated, (A−B), (C−D), (E−F) and (G−H). The servo position control logic switches between these error signals when their magnitudes are equal. Within a given track, the first switch occurs at TP/8 from the zero position. Each other switch within the track is then performed at TP/4.

It is appreciated that more than 3 secondary burst sets can be used in accordance with the scope of the present invention. However, as more secondary burst sets are used, the efficiency of the servo tracking system is reduced. Generalizing the present invention, if n secondary burst sets are used, then each individual burst set is offset from the primary burst set by a multiple of 1/n. The resulting PES signal then switches from the zero position at TP/(2n).

The preferred embodiment of the present invention, a primary servo burst set with multiple radially offset secondary servo burst sets for providing improved linear PES signals, is thus described. While the present invention has been described in particular embodiments, it should be appreciated that the present invention should not be construed as limited by such embodiments, but rather construed according to the below claims.

What is claimed is:

1. A storage medium comprising:
a disk surface comprising concentric tracks and a plurality of servo sectors each having recorded therein servo information that is seamless and untrimmed, said servo information for track positioning of a head; and
wherein said servo information comprises:
a primary burst set comprising a first servo data burst extending along a first radial line and a second servo data burst extending along an adjacent second radial line and comprising bursts that are positioned in between bursts of said first servo data burst, said primary burst set for defining positions of said concentric tracks; and
at least two secondary burst sets adjacent but radially offset from said primary burst set and each radially offset from each other.

2. A storage medium as described in claim 1 wherein said at least two secondary burst sets comprise:
a first secondary burst set radially offset from said primary burst set and shifted along its radial line by ⅓ track pitch from said primary burst set; and
a second secondary burst set radially offset from said primary burst set and said first secondary burst set and shifted along its radial line by ⅔ track pitch from said primary burst set.

3. A storage medium as described in claim 2 wherein said first secondary burst set comprises a third servo data burst and an adjacent but radially offset fourth servo data burst, said fourth servo data burst comprising bursts that are written in between bursts of said third servo data burst, said third and fourth servo data bursts for providing position error signals.

4. A storage medium as described in claim 3 wherein said second secondary burst set comprises a fifth servo data burst and an adjacent but radially offset sixth servo data burst, said sixth servo data burst comprising bursts that are written in between bursts of said fifth servo data burst, said fifth and sixth servo data bursts for providing position error signals.

5. A storage medium as described in claim 1 wherein said first and second servo data bursts of said primary servo burst set also provide position error signals.

6. A storage medium as described in claim 1 wherein said primary burst set is seamless in that bursts of said first servo data burst are written in positions that are independent of the positions of bursts of said second servo data burst.

7. A storage medium as described in claim 1 wherein said at least two secondary burst sets comprise:
   a first secondary burst set radially offset from said primary burst set and shifted along its radial line by ¼ track pitch from said primary burst set;
   a second secondary burst set radially offset from said primary burst set and said first secondary burst set and shifted along its radial line by 2/4 track pitch from said primary burst set; and
   a third secondary burst set radially offset from said primary burst set and said first and second secondary burst sets and shifted along its radial line by ¾ track pitch from said primary burst set.

8. A disk drive comprising:
   a storage medium comprising concentric tracks and a plurality of servo sectors each having recorded thereon servo information that is seamless and untrimmed;
   a head for reading and writing data from said storage medium; and
   a head positioning mechanism for positioning said head over said concentric tracks based on said servo information; and
   wherein said servo information comprises:
      a primary burst set comprising a first servo data burst extending along a first radial line and a second servo data burst extending along an adjacent second radial line and comprising bursts that are positioned in between bursts of said first servo data burst, said primary burst set for defining positions of said concentric tracks; and
      at least two secondary burst sets adjacent but radially offset from said primary burst set and each radially offset from each other.

9. A disk drive as described in claim 8 wherein said at least two secondary burst sets comprise:
   a first secondary burst set shifted along its radial line by ⅓ track pitch from said primary burst set; and
   a second secondary burst set shifted along its radial line by ⅔ track pitch from said primary burst set.

10. A disk drive as described in claim 9 wherein said first secondary burst set comprises a third servo data burst and an adjacent but radially offset fourth servo data burst, said fourth servo data burst comprising bursts that are written in between bursts of said third servo data burst, said third and fourth servo data bursts for providing position error signals.

11. A disk drive as described in claim 10 wherein said second secondary burst set comprises a fifth servo data burst and an adjacent but radially offset sixth servo data burst, said sixth servo data burst comprising bursts that are written in between bursts of said fifth servo data burst, said fifth and sixth servo data bursts for providing position error signals.

12. A disk drive as described in claim 8 wherein said first and second servo data bursts of said primary servo burst set also provide position error signals.

13. A disk drive as described in claim 8 wherein said primary burst set is seamless in that bursts of said first servo data burst are written in positions that are independent of the positions of bursts of said second servo data burst.

14. A disk drive as described in claim 8 wherein said at least two secondary burst sets comprise:
   a first secondary burst set shifted along its radial line by ¼ track pitch from said primary burst set;
   a second secondary burst set shifted along its radial line by 2/4 track pitch from said primary burst set; and
   a third secondary burst set shifted along its radial line by ¾ track pitch from said primary burst set.

\* \* \* \* \*